United States Patent [19]
Ward

[11] Patent Number: 5,456,050
[45] Date of Patent: Oct. 10, 1995

[54] SYSTEM TO PREVENT SPREAD OF FIRE AND SMOKE THROUGH WALL-BREACHING UTILITY HOLES

[75] Inventor: Thomas T. Ward, Clarksville, Va.

[73] Assignee: Construction Consultants & Contractors, Inc., Clarksville, Va.

[21] Appl. No.: 164,068

[22] Filed: Dec. 9, 1993

[51] Int. Cl.$^6$ .............................. E04B 5/48; F16K 17/36
[52] U.S. Cl. .................. 52/220.8; 52/1; 52/317; 52/232
[58] Field of Search ............... 52/1, 317, 220.8, 52/232

[56] References Cited

U.S. PATENT DOCUMENTS

| | | | |
|---|---|---|---|
| 4,086,736 | 5/1978 | Landrigan | 52/220.8 |
| 4,237,667 | 12/1980 | Pallucci et al. | 52/220.8 |
| 4,538,389 | 9/1985 | Heinen | 52/220.8 |
| 4,850,385 | 7/1989 | Haribeke | 52/232 X |
| 4,894,966 | 1/1990 | Bailey et al. | 52/220.8 X |
| 4,918,761 | 4/1990 | Harbeke | 52/220.8 X |
| 5,103,609 | 4/1992 | Thoreson et al. | 52/232 |
| 5,155,957 | 10/1992 | Robertson et al. | 52/220.8 |
| 5,174,077 | 12/1992 | Murota | 52/220.8 X |
| 5,351,448 | 10/1994 | Gohlke et al. | 52/1 |

OTHER PUBLICATIONS

3M Company, photocopy of cover and 2 pages of brochure entitled "3M Fire Protection Products".
International Protective Coatings Corp., photocopies of sales sheet for Firestop Device.

Primary Examiner—Wynn E. Wood
Attorney, Agent, or Firm—Olive & Olive

[57] ABSTRACT

The present invention provides a sleeve configured to be assembled through a wall-breaching hole so as to prevent the passage of flame and smoke therethrough. The sleeve has a barrel with a fixedly secured flange on one end thereof. An intumescent sheet material is adhered to the inner and the outer surface of the barrel. After passing the barrel through the hole in the wall, a second flange is mounted on the second end of the barrel. Each flange is fastened to a respective side of the wall through a series of holes in the flanges. Each flange has a series of circumferential tabs adapted to being bent inwardly and has a ring of intumescent putty within the tabs and a second ring of intumescent putty on its wall-facing surface. When the sleeve is installed and secured to the wall, a utility-carrying conduit is passed through the barrel and the tabs are bent inward to support and closely surround the conduit. In the presence of heat the intumescent material expands to fill any gaps between the sleeve and the conduit and between the sleeve and the wall so as to prevent the passage of smoke or flame.

16 Claims, 4 Drawing Sheets

5,456,050

SYSTEM TO PREVENT SPREAD OF FIRE AND SMOKE THROUGH WALL-BREACHING UTILITY HOLES

FIELD OF THE INVENTION

This invention relates to the field of fire safety apparatus and more particularly to apparatus for preventing flames and smoke from penetrating a wall through a hole formed to pass pipes, cables or the like.

BACKGROUND OF THE INVENTION

Water, gas, electricity, steam and the like as well as associated pipes, conduits and cables when associated with a building are often referred to collectively as the "utilities". In the process of construction, it is standard for walls and floors of a building to be built and later penetrated for the utilities to be installed. This method of construction normally means that the walls will be breached with a series of holes that are somewhat larger than the utility conduit to be installed. This size discrepancy is both an expedient method, from the standpoint of labor utilization, and a necessary variance because the utility conduit may be of a different size from the available standard sizes of hole making apparatus. Once such a hole is made and a conduit or a number of conduits are passed through, the gap remaining around the conduit or conduits provides a passage through which, in the event of a building fire, flame and smoke may be transmitted from one room to another, increasing damage and injury.

When the walls are constructed of materials which are able to contain a fire for a period of time, such a wall-breaching hole will void the value of the wall's fire retardancy. Much effort has been expended toward eliminating these wall-breaching holes, and thus containing a fire to a single room in a building. Underwriters Laboratories, Inc. has developed a Fire Resistance Directory, a section of which is devoted to Through-Penetration Firestop Devices, beginning on page 1252. A number of known devices and methods are listed therein. Included in the standard materials known in the industry and identified in the Directory are thermo-expansive, or intumescent, materials. The intumescent material referred to in the Directory and as used herein is initially activated to expand when the material reaches a temperature of about 150° C. (300° F.), and it expands to between 5–15 times its original volume.

In addition to the Underwriters Laboratories, Inc. Directory, the Minnesota Mining and Manufacturing Company (3M) provides a catalog of fire prevention products. Included in the 3M product grouping are intumescent materials which are supplied in the form of caulking and flexible strips. 3M also advertises a collar, taught in U.S. Pat. No. 5,103,609 to Thoreson et al. as an Intumescent Fire Stop Device. The '609 patent discloses a collar adapted to be installed around a utility conduit at the point of wall-penetration and having an intumescent lining and heat conducting tabs. The collar also includes wall-attachment tabs.

A further United States Patent directed to the field of the invention is U.S. Pat. No. 5,155,957 to Robertson et al. for a Fire Safety Device. The device of the '957 patent is adapted for closing through-holes in floors and walls and for stopping the potential spread of fire and smoke. The '957 device includes a section of conduit, a cup-shaped retainer and a quantity of intumescent material.

The above discussed devices and others known in the trade are able to provide a degree of fire and smoke protection, but are somewhat dependent on installer skill or do not afford the effectiveness provided by the present invention.

It is therefore an object of this invention to provide a fire and smoke blocking system to seal wall-breaching holes in a building wall or floor.

It is another object of this invention to provide a fire and smoke blocking system which is simple to install in a formed hole.

It as an additional object of this invention to provide a fire and smoke blocking system which will maximize the sealing of a wall-breaching hole in case of a fire.

Other objects and advantages will be more fully apparent from the following disclosure and appended claims.

SUMMARY OF THE INVENTION

The present invention provides a sleeve device configured to be secured into a wall-breaching hole through which a utility conveying conduit is to be passed. The sleeve has a tubular barrel with a single flange attached perpendicularly at one end and a series of screw holes formed through the flange. The inner and outer surfaces of the barrel, as well as the wall-facing surface of the flange are lined with intumescent material. After the barrel is placed into the hole and the attached flange is secured to one side of the wall with the distal end of the barrel situated approximately at the opposite side of the wall, a second flange, also having a layer of intumescent material attached, is mounted on the barrel and secured to the wall. The utility conduit is then placed through the sleeve and a series of bendable tabs, formed on the outer end of each flange in a ring adjacent the sleeve, are bent inwardly to lightly support the conduit in position. In case of fire or other event causing an elevated temperature, the intumescent material expands to seal the opening between the flanges and the wall surfaces, between the barrel outer surface and the wall hole and between the barrel inner surface and the conduit. All passages are thus effectively sealed so that fire and smoke cannot pass from one room to another.

DESCRIPTION OF THE PREFERRED EMBODIMENT

Figure 1:
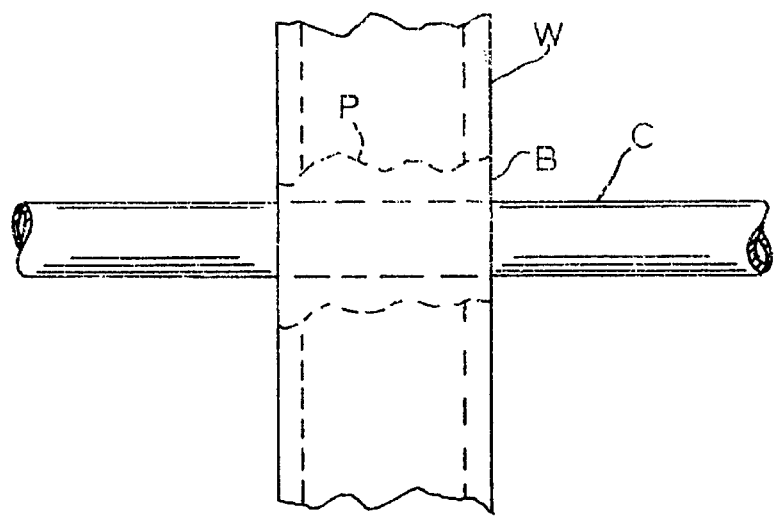
FIG. 1 is a side elevation view of the prior art method of passing a utility conduit through a wall-breaching hole and sealing the surrounding space with a putty.

According to the prior art process for sealing wall apertures described above, FIG. 1 illustrates a wall W having breaching aperture B through which utility conduit C is passed. Conduit C is used to indicate any of electrical cable, gas pipe, water pipe or the like. A fire retardant, or intumescent, putty material P is then packed around the conduit C to seal the aperture. In addition to this procedure requiring a certain amount of skill, the putty application cannot be effectively checked for completeness without being destroyed in the process.

Figure 2:
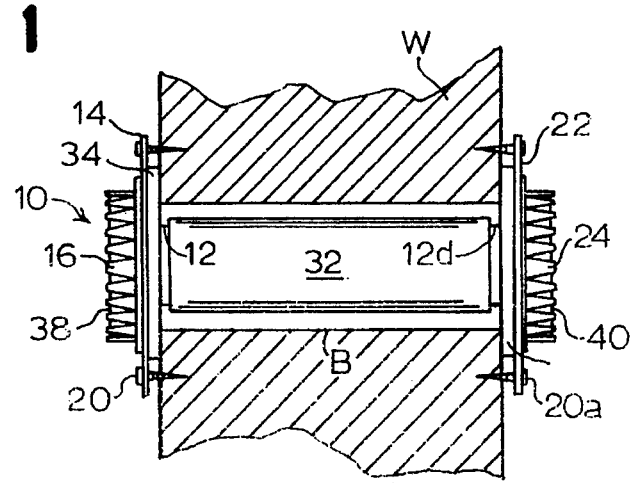
FIG. 2 is a cross sectional side elevation of a wall with a wall-breaching hole having a fire blocking sleeve of the invention installed therethrough.
Figure 3:
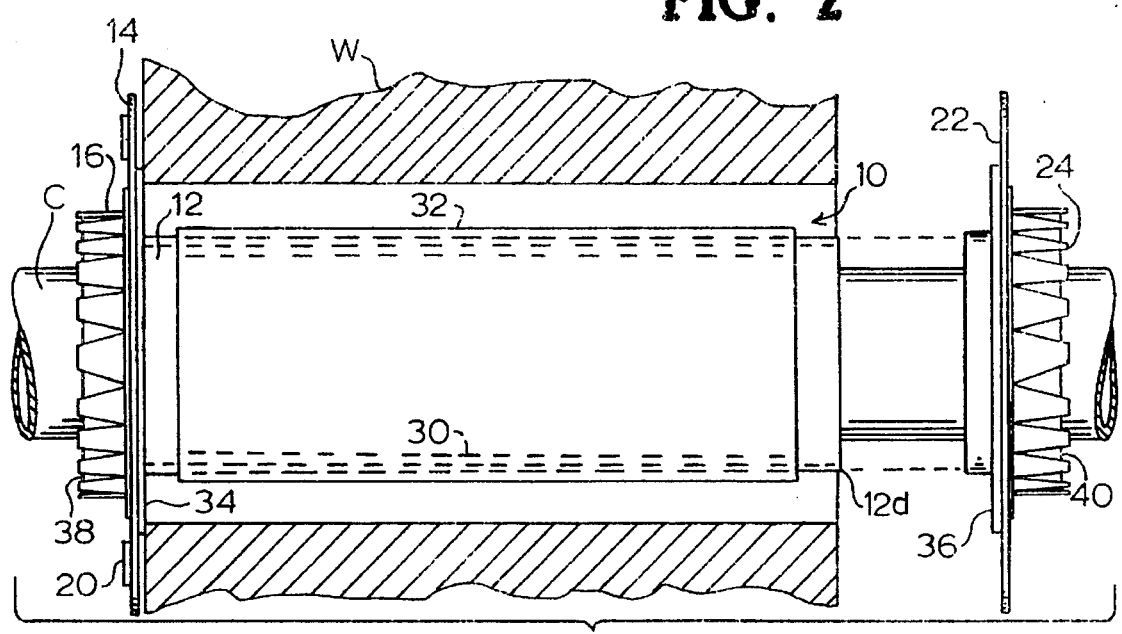
FIG. 3 is a side elevation view of the fire blocking sleeve of the invention illustrating a first flange attached to the barrel and a second flange positioned for being installed in a wall shown in cross section for clarity.

In contrast, the fire blocking sleeve of the invention is pre-assembled in a factory with the proper amount and type of intumescent material in needed places and requires only to be placed into the cut hole and screwed to the wall surface for complete and secure fire protection. Furthermore, in the time before any fire, the conduit may be worked on or replaced without requiring new fire protection. The accompanying FIGS. 2–6 illustrate the present invention in various stages of installation in a wall having a through hole. FIG. 2 shows fire blocking sleeve 10 with barrel 12 passing through wall-breaching hole B in wall W to a distance so that the distal end 12d of barrel 12 lies outward of the plane of the right (as illustrated in FIG. 3) surface of wall W. As used herein, the term "wall" is understood to indicate any building partition, including floors, ceilings, inner walls and outer walls. Fixed flange 14 is fixedly assembled to barrel 12 and is secured to wall W with fasteners 20, such as screws. Defining an aperture in the center of fixed flange 14 are a series of circumferentially disposed, bendable tabs 16 oriented parallel to the tube axis, facing in a direction away from barrel 12 (FIG. 3). An independent flange 22 is mounted on the distal end of barrel 12 and is secured into wall W by means of fasteners 20a. Independent flange 22 has a series of tabs 24 similar to tabs 16 of fixed flange 14, but oriented in an opposite direction. In the construction of the preferred embodiment, barrel 12 and flanges 14 and 22 are formed of sheet steel. Fasteners 20, 20a, when fixed to wall W act to hold sleeve 10 in assembled relationship. Other means of fastening could, optionally, be used.

Figure 5:
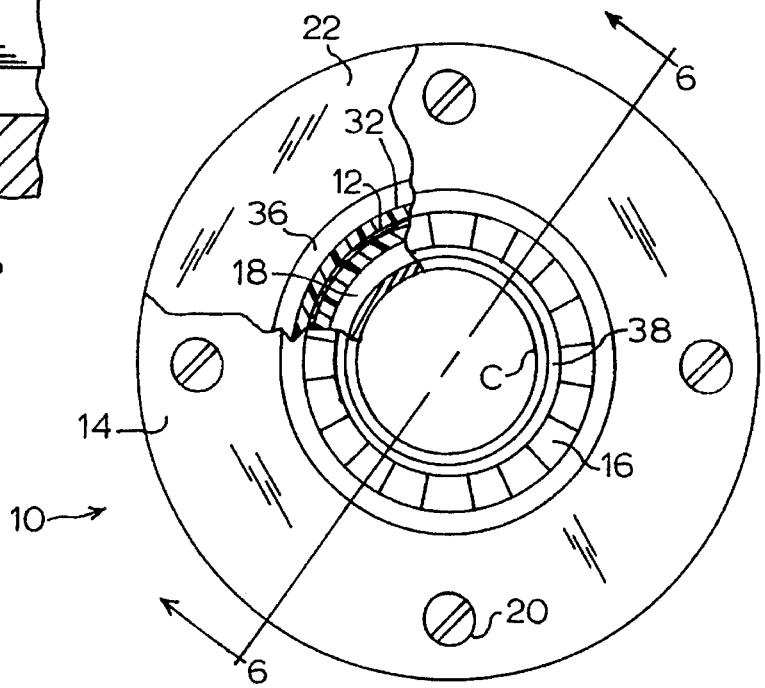
FIG. 5 is a fragmented end elevation view of the fire blocking sleeve of the invention with a utility conduit passing through and the tabs bent inward to support the conduit.

An illustration of the sleeve 10 of the invention is shown prior to assembly in FIG. 3 in side elevation, and in FIG. 5 in end elevation. A layer 32 of intumescent sheet material extends along the external surface of barrel 12 so as to end near, but not in contact with, fixed flange 14 on its first end and near, but not at the opposite end of barrel 12 on its second end. A layer 30 of intumescent sheet material extends along the internal barrel surface substantially from end to end of barrel 12. The intumescent layers 30 and 32, according to the preferred embodiment, are formed of preformed sheet material, such as 3M Fire Barrier FS195 195 Wrap/Strip and are mounted adhesively to barrel 12.

A toroidal shaped planar fixed flange intumescent caulk 34 (FIG. 4) is adhered to the surface of fixed flange 14 so as to contact the surface of wall W. A ring of fixed flange tab intumescent caulk 38 (FIG. 6) is adhered to the inwardly facing surface of tabs 16. Similar intumescent toroidal caulk 36 and ring caulk 40 (FIG. 3) are assembled to independent flange 22 and tabs 24. The intumescent caulk material employed according to the preferred embodiment is, for example, 3M Fire Barrier Moldable Putty MPP-2. The outer diameter of flange intumescent caulks 34 and 36 is somewhat greater than the diameter of the hole B in wall W. The inner diameter of tab intumescent caulk rings 38 and 40 is somewhat greater than the diameter of conduit C.

A template (not shown) is supplied with the components of the system to simplify spotting and pre-drilling appropriate mounting holes in wall W before installing sleeve 10. It is recognized that a hole B formed through wall W as described above is of a size which is larger than the external diameter of external barrel intumescent material 32.

Figure 4:
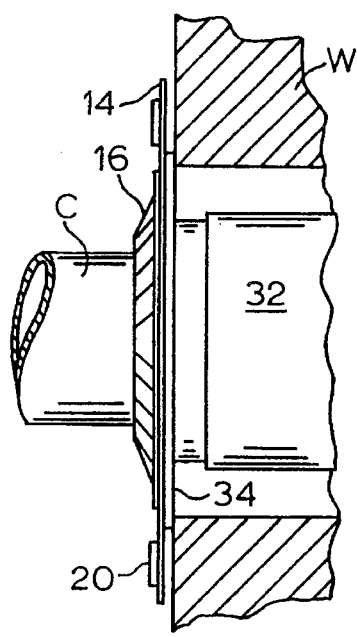
FIG. 4 is a partial view showing the fixed flange end of the fire blocking sleeve of the invention of FIG. 3 with a utility conduit passed through and with the tabs of the invention bent into a position to support the conduit.
Figure 6:
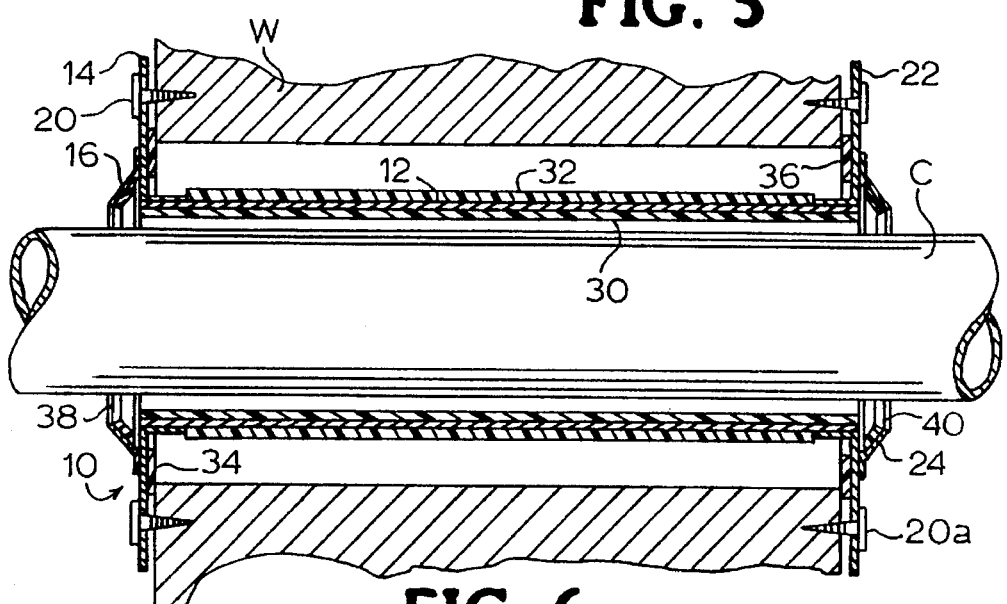
FIG. 6 is a cross section view of the fire blocking sleeve taken in the direction of line 6—6 of FIG. 5.

After sleeve 10 is installed and secured to wall W, a conduit C, configured to carry a particular utility, is passed through the barrel 12 of fire blocking sleeve 10, as shown in side view in FIGS. 4 and 6 and in end view in FIG. 5. Tabs 16 on the fixed flange 14, and tabs 24 on the independent flange 22, are bent radially inwardly to press lightly on the outer surface of conduit C, pressing intumescent caulk rings 38 and 40 into contact with conduit C to substantially close the gap therebetween against air draft. Tab sets 16 and 24 with their respective caulk rings 38 and 40 are also effective to prevent the passage of smoke prior to the occurrence of intumescent expansion.

Further detail of the construction of the present invention is shown in cross section in FIG. 6 as installed. In this illustration, the relative positions of intumescent sheets 30, 32 and intumescent caulks 38 and 40 with respect to conduit C and caulks 34, 36 relative to wall W are clearly shown. In practice, sleeve 10 of the invention is supplied in a variety of diameters to enable use of a particular size sleeve 10 for a range of conduit sizes, including passing multiple conduits through a single sleeve as disclosed below.

Figure 7:
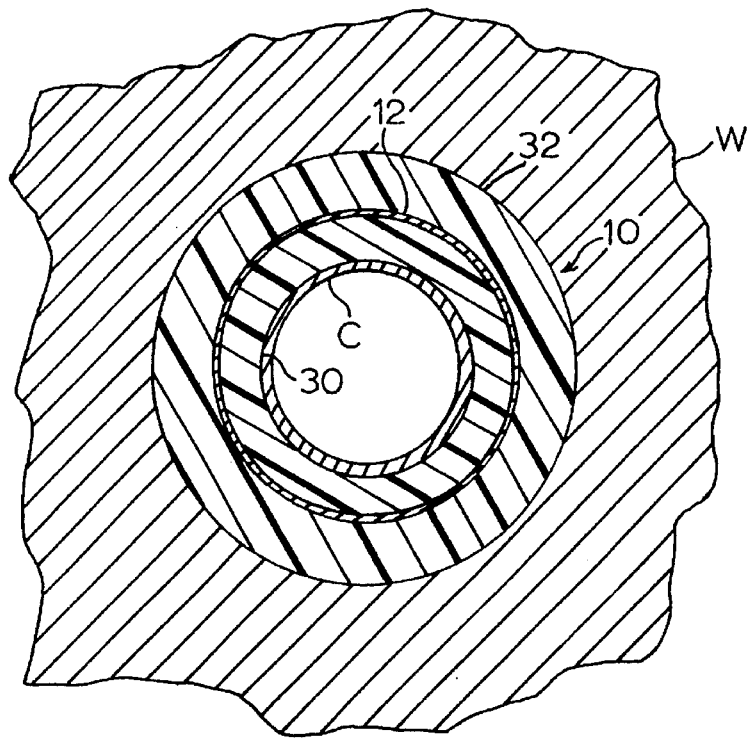
FIG. 7 is an end cross sectional elevation view of the fire blocking sleeve of the invention installed through a wall-breaching hole and with the intumescent material expanded to seal around a single conduit.

FIG. 7 illustrates an end cross sectional view of sleeve 10, shown after exposure to heat in excess of 150° C. (300° F.) has caused intumescent sheets 30 and 32 and intumescent caulk 34, 36, 38 and 40 to expand and close all gaps in the system. In this condition, as is clearly shown, no flame or smoke will penetrate from a room on one side of wall W to the other side.

Figure 8:
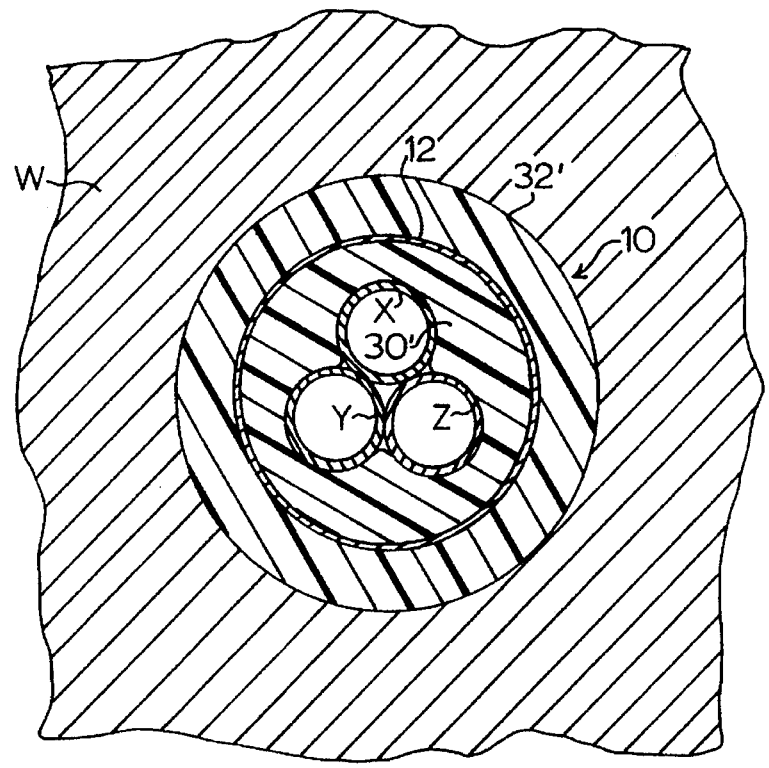
FIG. 8 is an end cross sectional elevation view of the fire blocking sleeve of the invention with the intumescent material expanded to seal around three enclosed conduits.

As indicated briefly above, the present invention is adapted to be used not only with a single conduit of circular cross section, but with a plurality of conduits through the same sleeve, or with conduits of different shape or size. FIG. 8 illustrates an end view of the present invention with three utility conduits X, Y and Z passing therethrough. As illustrated in FIG. 8, intumescent caulk 30' has expanded to substantially fill the space between the external contours of the three clustered conduits.

Figure 9:
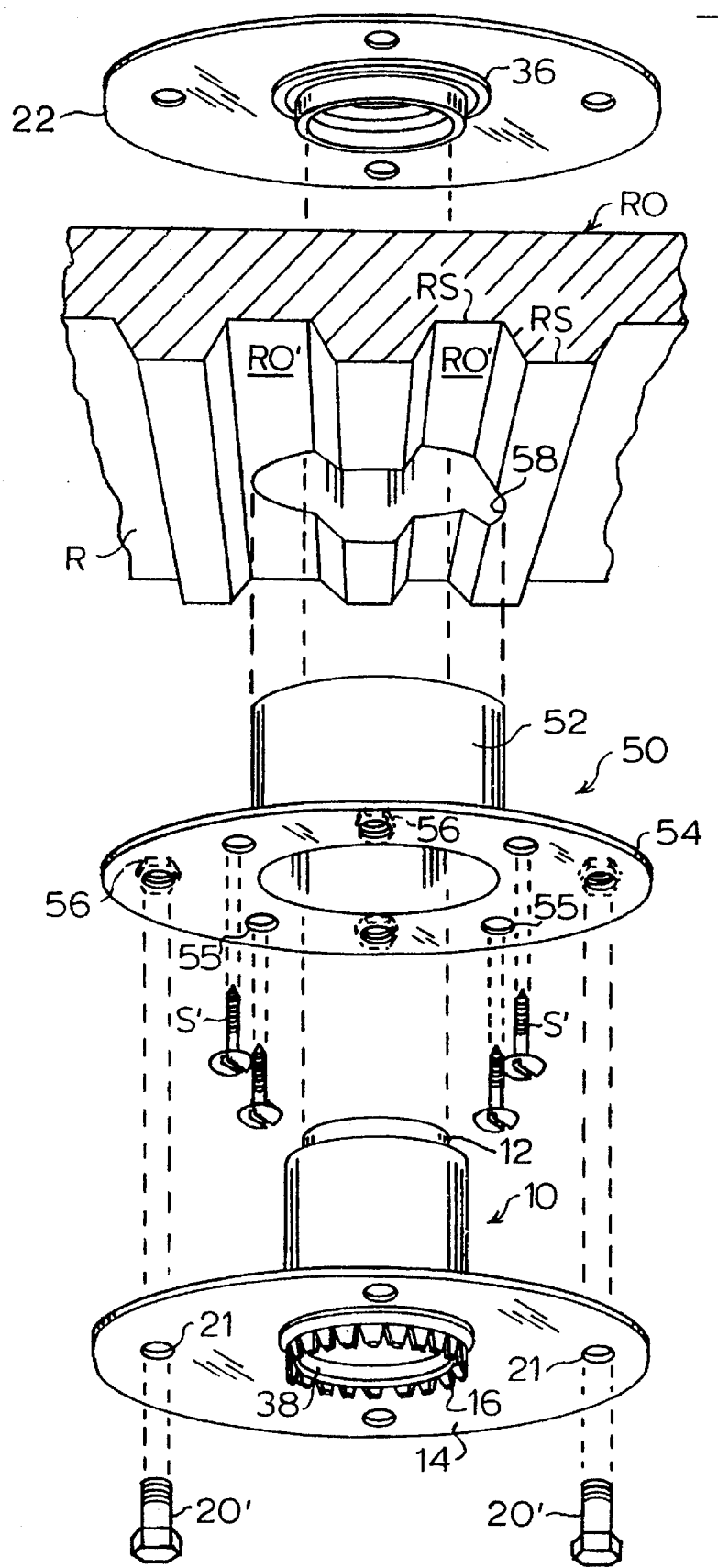
FIG. 9 is an exploded perspective view of the fire-blocking sleeve of the invention as adapted to assemble within an adapter designed for irregular wall surfaces.

In certain construction walls, especially certain ceilings, a prefabricated corrugated surface sheet may be used. Such a wall R, shown in the orientation of a ceiling or floor in FIG. 9, and having corrugations RS on one side thereof, is benefitted by a further component of the system of the invention. According to this use, a hole 58 is formed in corrugated wall R. Next, tube 52 of adapter 50, having a perpendicularly attached flange 54 on one end thereof, is placed through hole 58 so as to essentially terminate at the plane of the outer surface RO (parallel to lower surface RO') of wall R. Tube 52, unlike the various sizes of conduits C which may be used, is configured to closely match the diameter of hole 58. Adapter flange 54 is then secured to wall R by fasteners S' through holes 55. Adapter flange 54 additionally has a series of threaded nuts 56 secured in matched position to a second series of holes so that when a sleeve 10 is placed with its barrel 12 within tube 52, the screw holes 21 of flange 14 and nuts 56 of adapter flange 54 are in substantial alignment with fasteners 20 engaging nuts 56. The outer end of sleeve barrel 12 is then fitted with an independent flange 22 which is fastened to the outer surface RO of wall R with additional fasteners (not shown). In this configuration, the adapter 50 allows installation of the sleeve of the invention regardless of the wall surface shape encountered. Regardless of the relative positions of hole 58 and corrugations RS, adapter 50 effectively prevents passage of smoke and flames through wall R.

Thus, as illustrated and disclosed herein, the fire and smoke blocking sleeve of the invention satisfies the major objectives of preventing the passage of flame or smoke in case of a fire in a building in a reliable and easy-to-install system.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A system for blocking the passage of fire and smoke through a wall-breaching hole formed for passing a utility conduit through a wall, comprising:
   (a) a hollow barrel having a first open end, a second open end, an inner surface and an outer surface and being a of a length at least equal to the thickness of said wall;
   (b) a first substantially planar flange with a wall-facing surface and having a hole formed therethrough, said first flange being fixedly secured to said first end of said barrel so that said hole and said barrel are co-axial;
   (c) a layer of intumescent material formed adjacent each of said inner and said outer surfaces of said barrel such that said layer of intumescent material layered on said barrel forms an outer diameter able to be inserted into a hole formed through said wall;
   (d) a layer of intumescent material formed adjacent said wall-facing surface of said first flange;
   (e) a second substantially planar flange with a wall-facing surface and having a hole formed therethrough, said second flange adapted to be removeably mounted on said second end of said barrel so that said second flange hole and said barrel are co-axial;
   (f) intumescent material formed adjacent said wall-facing surface of said second flange; and (g) means to secure said first flange and said second flange to said wall when said barrel is passed therethrough so as to cause both said flanges to remain in close contact with said wall.

2. The system of claim 1, further comprising a series of circumferentially disposed bendable tabs formed adjacent the respective hole in each said first and second flange.

3. The system of claim 2 wherein a ring of intumescent caulk is mounted within each said series of bendable tabs.

4. The system of claim 1 further comprising a plurality of fastener holes formed through said first flange and through said second flange.

5. The system of claim 4 wherein said means to secure said first flange and said second flange to said wall comprises a plurality of fasteners passing through said fastener holes to secure each said flange to respective surfaces of said wall.

6. The system of claim 1 wherein said layer of intumescent material is layered on said barrel surfaces by means of an adhesive.

7. The system of claim 6, further comprising a series of circumferentially disposed bendable tabs formed adjacent the hole in each said first and second flange.

8. The system of claim 7 wherein said tabs associated with said first flange and said tabs associated with said second flange are oriented to face in opposite directions.

9. The system of claim 7 wherein a ring of intumescent caulk is mounted within each said series of bendable tabs.

10. The system of claim 1, further comprising an adapter having a substantially cylindrical tube extending from a first end to a second end and of a diameter greater than said layer of intumescent material layered on said outer surface of said barrel and a substantially planar adapter flange having a hole formed therethrough and fixedly assembled to said tube first end so that said adapter flange hole and said tube are co-axial.

11. The system of claim 10 further comprising a plurality of fastener holes formed though said adapter flange.

12. The system of claim 10 wherein said means to secure said first flange and said second flange to said wall comprises a plurality of fasteners passing through said fastener holes to secure each said flange to respective surfaces of said wall.

13. The system of claim 11 wherein said layer of intumescent material is layered on said barrel surfaces by means of an adhesive.

14. The system of claim 11, further comprising a series of circumferentially disposed bendable tabs formed adjacent the hole in each said first and second flange.

15. The system of claim 14 wherein said tabs associated with said first flange and said tabs associated with said second flange are oriented to face in opposite directions.

16. The system of claim 14 wherein a ring of intumescent caulk is mounted within each said series of bendable tabs.

* * * * *

UNITED STATES PATENT AND TRADEMARK OFFICE
CERTIFICATE OF CORRECTION

PATENT NO. : 5,456,050
DATED : October 10, 1995
INVENTOR(S) : Thomas T. Ward

It is certified that error appears in the above-indentified patent and that said Letters Patent is hereby corrected as shown below:

Column 3, line 64, correct "FS195 195" to read --FS195--.

Column 5, line 32, delete "a".

Signed and Sealed this

Twenty-sixth Day of December, 1995

Attest:

BRUCE LEHMAN

*Attesting Officer*  *Commissioner of Patents and Trademarks*